United States Patent
Hamada

(10) Patent No.: US 11,254,194 B2
(45) Date of Patent: Feb. 22, 2022

(54) VEHICLE DOOR STRUCTURE AND COVER MODULE

(71) Applicant: YAZAKI CORPORATION, Tokyo (JP)

(72) Inventor: Ryo Hamada, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/070,940

(22) Filed: Oct. 15, 2020

(65) Prior Publication Data

US 2021/0114441 A1 Apr. 22, 2021

(30) Foreign Application Priority Data

Oct. 16, 2019 (JP) ............... JP2019-189680

(51) Int. Cl.
*B60J 5/04* (2006.01)
*B60R 16/02* (2006.01)

(52) U.S. Cl.
CPC .......... *B60J 5/0413* (2013.01); *B60J 5/0415* (2013.01); *B60J 5/0468* (2013.01); *B60R 16/0207* (2013.01)

(58) Field of Classification Search
CPC .............................. B60J 5/0413; B60J 5/0468
USPC .......................................... 296/146.5, 146.7
See application file for complete search history.

(56) References Cited

U.S. PATENT DOCUMENTS

| | | | | |
|---|---|---|---|---|
| 6,000,959 A | * | 12/1999 | Curtindale | .......... B60R 16/0207 439/246 |
| 6,504,262 B1 | | 1/2003 | Aoki et al. | |
| 7,059,659 B2 | * | 6/2006 | Smith | .................... B60J 5/0418 296/146.7 |
| 7,410,204 B2 | * | 8/2008 | Koa | ...................... B60J 5/0416 296/152 |
| 10,023,134 B2 | * | 7/2018 | Osada | ................. B60R 13/0243 |
| 10,933,822 B2 | * | 3/2021 | Enomoto | ................. B60L 1/00 |

FOREIGN PATENT DOCUMENTS

| | | |
|---|---|---|
| JP | 2001-122055 A | 5/2001 |
| JP | 2005-41413 A | 2/2005 |

* cited by examiner

*Primary Examiner* — Joseph D. Pape
(74) *Attorney, Agent, or Firm* — Kenealy Vaidya LLP

(57) ABSTRACT

A vehicle door structure includes an outer panel, an inner panel assembled to a vehicle width direction inner side surface of the outer panel so as to form a panel space with the outer panel, a cover assembled to the inner panel so as to close a service hole, which is a through hole formed in the inner panel in order to facilitate a work in the panel space, a control box assembled to the cover and configured to control input/output of electric power and/or control signal to/from at least one of electric components disposed on a vehicle door; and a door trim assembled to a vehicle width direction inner side surface of the inner panel so as to cover the cover and the control box.

4 Claims, 4 Drawing Sheets

VEHICLE DOOR STRUCTURE AND COVER MODULE

CROSS-REFERENCE TO RELATED APPLICATIONS

This application is based on and claims priority under 35 USC 119 from Japanese Patent Application No. 2019-189680 filed on Oct. 16, 2019, the contents of which are incorporated herein by reference.

TECHNICAL FIELD

The present invention relates to a vehicle door structure and a cover module.

BACKGROUND ART

In the related art, a vehicle door structure including an outer panel, an inner panel assembled to a vehicle width direction inner side surface of the outer panel, and a door trim assembled to a vehicle width direction inner side surface of the inner panel is widely known (see, for example, Patent Literature 1).

CITATION LIST

Patent Literature

Patent Literature 1: JP-A-2001-122055

In the vehicle door structure described in the above literature, a control box configured to control input/output of electric power and/or control signal to/from a plurality of electric components disposed on the vehicle door is assembled to a part of the vehicle width direction inner side surface of the inner panel, and the control box is covered with a door trim. Therefore, there is a problem that a thickness of the door (dimension in the vehicle width direction) increases by a thickness of the control box (dimension in the vehicle width direction).

SUMMARY OF INVENTION

An object of the present invention is to provide a vehicle door structure and a cover module capable of preventing an increase in thickness of the door due to the assembly of a control box.

According to the present embodiment.
a vehicle door structure includes:
an outer panel:
an inner panel assembled to a vehicle width direction inner side surface of the outer panel so as to form a panel space with the outer panel;
a cover assembled to the inner panel so as to close a service hole, which is a through hole formed in the inner panel in order to facilitate a work in the panel space;
a control box assembled to the cover and configured to control input/output of electric power and/or control signal to/from at least one of electric components disposed on the vehicle door; and
a door trim assembled to a vehicle width direction inner side surface of the inner panel so as to cover the cover and the control box.

In addition, according to an embodiment, a cover module includes: a cover assembled to an inner panel constituting a part of a vehicle door structure so as to close a service hole, which is a through hole formed in the inner panel in order to facilitate a work in a panel space formed between an outer panel and the inner panel assembled to a vehicle width direction inner side surface of the outer panel; and
a control box assembled to the cover and configured to control input/output of electric power and/or control signal to/from at least one of electric components disposed on the vehicle door.

DESCRIPTION OF EMBODIMENTS

Embodiment

Hereinafter, a vehicle door structure 1 according to an embodiment of the present invention will be described with reference to the drawings. The vehicle door structure 1 is a structure of a right front door of a vehicle that is opened and closed by rotating with respect to a vehicle body of the vehicle.

Figure 1:
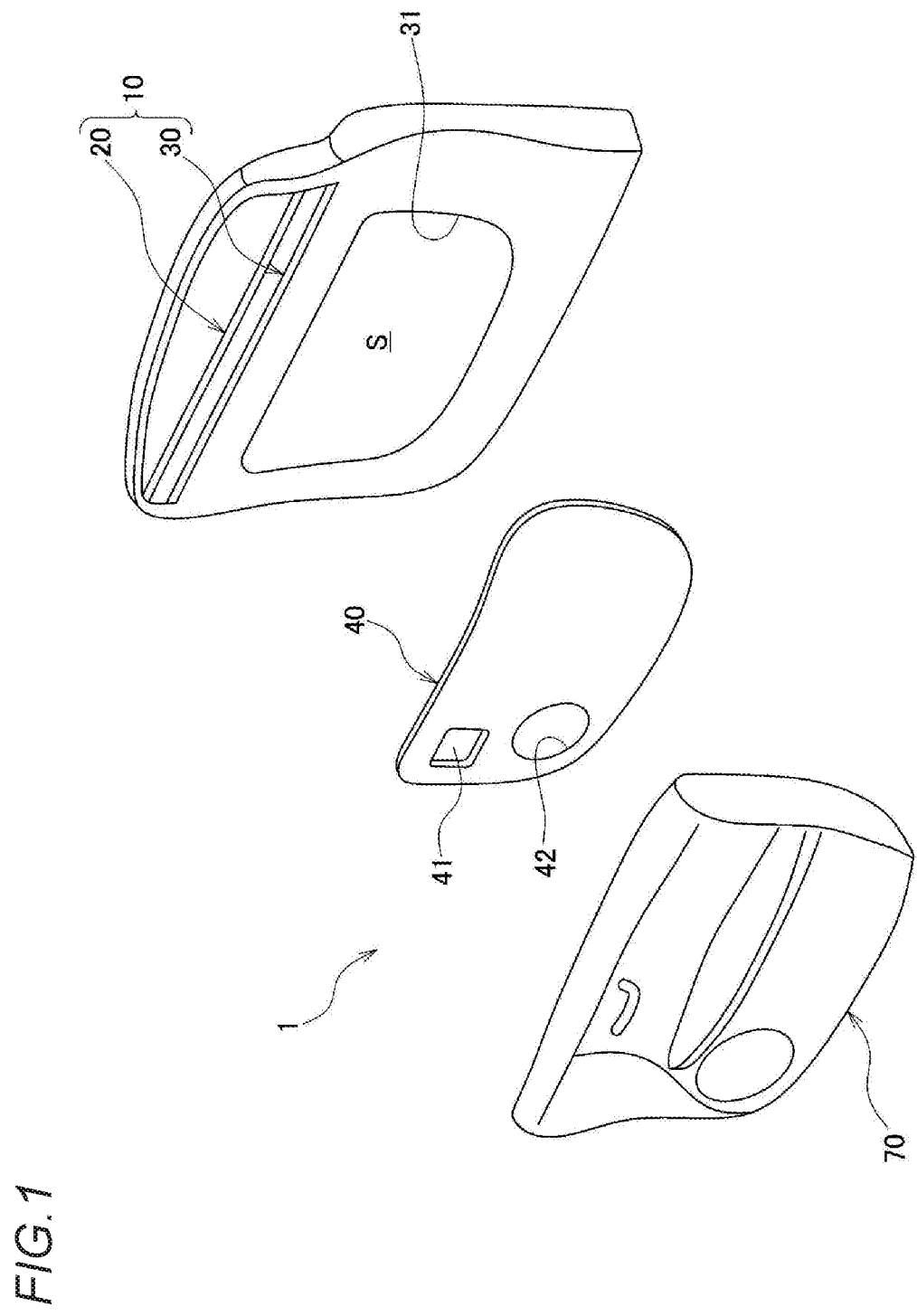
FIG. 1 is an exploded perspective view of a vehicle door structure according to an embodiment of the present invention.
Figure 2:
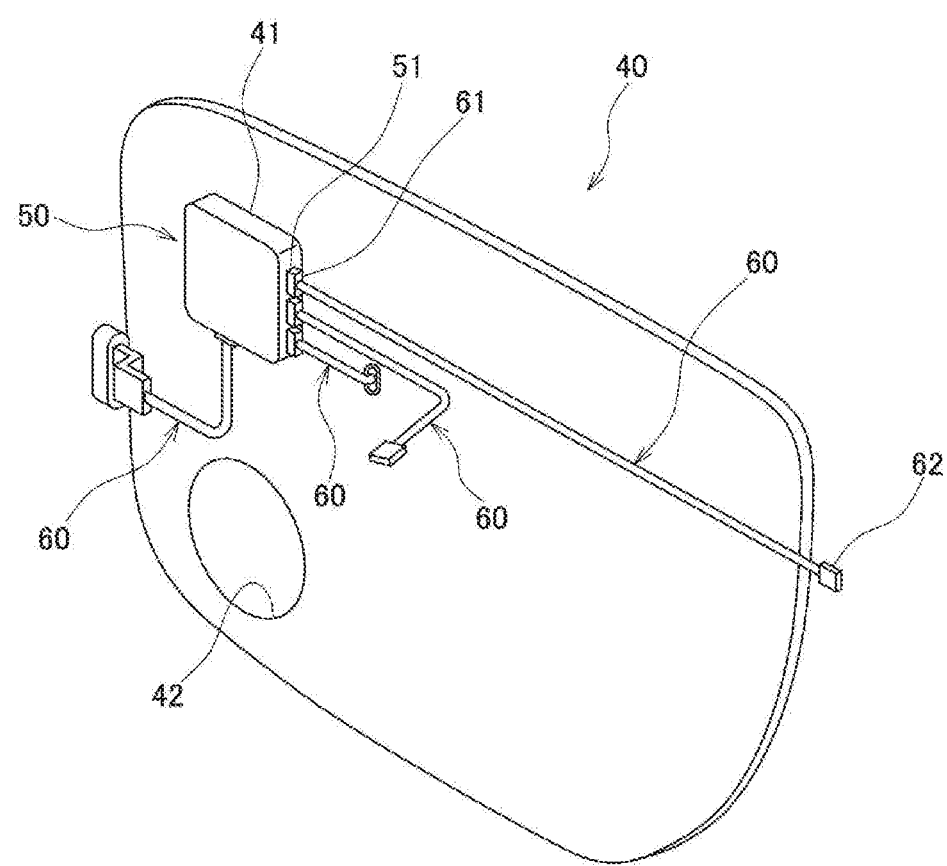
FIG. 2 is a perspective view of a cover module in which a control box having a plurality of electric wires connected to a cover shown in FIG. 1 is assembled.

As shown in FIG. 1 and FIG. 2, the door structure 1 includes a door panel 10 including an outer panel 20 and an inner panel 30, a cover 40 configured to close a service hole 31 of the inner panel 30, a control box 50 assembled to the cover 40, a plurality of electric wires 60 connected to the control box 50, and a door trim 70 assembled to the inner panel 30. Hereinafter, each member constituting the door structure 1 will be sequentially described.

As shown in FIG. 1, the door panel 10 includes the outer panel 20 and the inner panel 30 assembled to a vehicle width direction inner side surface of the outer panel 20. A panel space S is formed between the outer panel 20 and the inner panel 30. A vehicle width direction outer side surface of the outer panel 20 is a surface constituting an external appearance of the door on a vehicle outer side. Both the outer panel 20 and the inner panel 30 are typically made of a metal, and may also be made of a resin. The inner panel 30 is assembled to the outer panel 20 by one of known methods such as welding.

The inner panel 30 is formed with the service hole 31 penetrating the vehicle width direction in order to facilitate a work in the panel space S (typically, a work to install an electric component in the panel space S). In this example, the service hole 31 is a through hole that opens to a relatively large central region of the vehicle width direction inner side surface of the inner panel 30 excluding a peripheral portion thereof and is in communication with the panel space S.

As shown in FIG. 1, the cover 40 is assembled to the inner panel 30 so as to close the service hole 31 of the inner panel 30. When the cover 40 closes the service hole 31 of the inner panel 30, the panel space S becomes a liquid-tight and air-tight space. An overall shape (contour shape) of the cover 40 is a shape corresponding to a contour shape of the service hole 31 in this example. Therefore, the cover 40 has a relatively large flat plate shape. The cover 40 is typically made of a resin, and may also be made of a metal. The cover 40 is assembled to the inner panel 30 by one of known methods such as fitting, bonding, and bolt fastening.

A recess portion 41, which is recessed to a vehicle width direction outer side and opens to a vehicle width direction inner side, is formed at a predetermined position on a vehicle width direction inner side surface of the cover 40. As shown in FIG. 2, the control box 50 is assembled (fitted) into the recess portion 41. Therefore, the recess portion 41 has a rectangular shape corresponding to an overall shape (rectangular parallelepiped shape) of the control box 50. In this example, a hole 42 (through hole) for attaching a door speaker is formed at a position other than the recess portion 41 of the cover 40.

As shown in FIG. 2, the control box 50 has a rectangular parallelepiped shape. Inside the control box 50, a control unit (ECU, microcomputer, not shown) capable of controlling input/output of electric power and/or control signal to/from a plurality of electric components (not shown) disposed on the door is provided. Examples of the plurality of electric components disposed on the door include a motor for an electric door mirror, a motor for an electric power window, a door speaker, and a courtesy lamp.

When the control box 50 is fitted into the recess portion 41 of the cover 40, a protrusion height of the control box 50 from a plane of the vehicle width direction inner side surface of the cover 40 is lower than that in a mode in which the control box 50 is assembled on the plane of the vehicle width direction inner side surface of the cover 40.

On a side surface (a surface orthogonal to the vehicle width direction) of the control box 50 exposed (protruded) to the outside in a state where the control box 50 is fitted into the recess portion 41 of the cover 40, a plurality of (four in this example) electric wire connection portions 51 (connector portions) are disposed along a peripheral direction of the side surface. A connector 61 (to be described later) of a corresponding electric wire 60 is connected to the corresponding electric wire connection portion 51. Accordingly, the control unit of the control box 50 and each electric wire 60 are electrically connected to each other via the corresponding electric wire connection portion 51.

Each of the plurality of (four in this example) electric wires 60 includes the connector 61 connected to a side end portion of the control box and a connector 62 connected to a side end portion of the electric component. When connector 61 of the electric wire 60 is connected to the electric wire connection portion 51 of the control box 50, and the connector 62 of the electric wire 60 is connected to electric component, the control unit of the control box 50 and the electric component are electrically connected to each other. In this example, the plurality of (four) electric components disposed on the vehicle door are connected to the plurality of (four) electric wire connection portions 51 of the control box 50 in a one-to-one relationship via the plurality of (four) electric wires 60. Therefore, there is no position for the plurality of electric wires 60 extending from the control box 50 to gather together.

In the example shown in FIG. 2, the electric wires 60 are each connected to the entire of each of the plurality (four) of electric wire connection portions 51. Alternatively, depending on a specification of the door (vehicle grade), the electric wires 60 may be each connected only to a part of each of the plurality (four) of electric wire connection portions 51. Typically, a mode is assumed, in which the electric wire 60 is connected to the electric wire connection portion 51 corresponding to an electric component which is a standard product mounted on all grades of the vehicle, and the electric wire 60 is not connected to the electric wire connection portion 51 corresponding to an electric component which is an optional product mounted only on some grades of the vehicle. In this way, the number of the electric wires 60 connected to the electric wire connection portions 51 can be increased or decreased for each door specification (vehicle grade).

The plurality of electric wires 60 extending from the control box 50 fitted in the recess portion 41 of the cover 40 can be fixed to the vehicle width direction inner side surface of the cover 40. When fixing the electric wire 60, the electric wire 60 may be accommodated in a groove for the electric wire 60 formed in the vehicle width direction inner side surface of the cover 40. In this way, the control box 50 is fitted into the recess portion 41 of the cover 40, and the plurality of electric wires 60 extending from the control box 50 are fixed to the cover 40, so that a cover module (see FIG. 2) in which the cover 40, the control box 50, and the plurality of electric wires 60 are integrated is formed.

As shown in FIG. 1, the door trim 70 is assembled to the vehicle width direction inner side surface of the inner panel 30 so as to cover the cover 40, the control box 50, and the plurality of electric wires 60 (that is, the cover module). A vehicle width direction inner side surface of the door trim 70 is a surface constituting an external appearance of the door on a vehicle interior side. The door trim 70 is assembled to the inner panel 30 by one of known methods such as fitting, bonding, and bolt fastening. In the above, each member constituting the door structure 1 has been described.

Next, a procedure for assembling the door structure 1 will be briefly described. First, the inner panel 30 is assembled to the outer panel 20 so as to prepare the door panel 10, and the control box 50 is fitted into the recess portion 41 of the cover 40 and the plurality of electric wires 60 extending from the control box 50 are fixed to the cover 40 so as to prepare the cover module described above. Next, the cover module is assembled to the inner panel 30 so as to close the service hole 31 of the inner panel 30 in the door panel 10. Then, the door trim 70 is assembled to the inner panel 30 so as to cover the cover module. Accordingly, the door structure 1 is obtained.

The cover module may be prepared at a parts manufacturer's factory, the prepared cover module may be transported to an automobile manufacturer's factory, and the outer panel 20, and the inner panel 30, and the door trim 70 may be prepared and the outer panel 20, the inner panel 30, the cover module, and the door trim 70 may be assembled in the automobile manufacturer's factory.

According to the vehicle door structure 1 of the present embodiment described above, the service hole 31 formed in the inner panel 30 in order to facilitate the work (typically, a work to install the electric component in the panel space S) in the panel space S between the outer panel 20 and the inner panel 30 is closed by the cover 40, the control box 50 is assembled (fitted) into the recess portion 41 formed in the vehicle width direction inner side surface of the cover 40, and the cover 40 and the control box 50 are covered by the door trim 70. Therefore, as compared with a mode in which the control box 50 is assembled to the inner panel 30, it is possible to prevent the increase in thickness of the door due to the assembly of the control box 50.

In addition, the control box 50, to which the plurality of electric wires 60 to be connected to the plurality of electric components later are connected, is assembled to the cover 40 so as to prepare the cover module, and then the cover module can be assembled to the inner panel 30. Therefore, as compared with a mode in which the control box 50, to which the plurality of electric wires 60 are connected, and the cover 40 are individually assembled to the inner panel 30, the work of assembling the components to the inner panel 30 is easier.

Further, since the service hole 31 is closed by the cover 40, it is possible to provide the door structure 1 having excellent waterproofness and sound insulation. Further, when a sensor for detecting a collision of the vehicle with the door by detecting a change in pressure in the panel space S is installed in the panel space S, since the service hole 31 is closed by the cover 40, it is possible to provide a door structure in which an appropriate pressure fluctuation can occur in the panel space S when the vehicle collides with the door.

Furthermore, the plurality of electric wire connection portions 51 disposed along the peripheral direction of the side surface of the control box 50 are connected to the plurality of electric components in a one-to-one relationship via the plurality of electric wires 60. Therefore, there is no position for the plurality of electric wires 60 extending from the control box 50 to gather together, so that it is possible to prevent the increase in thickness of the door due to an increase in diameter of a bundle of electric wires in which the plurality of electric wires 60 are gathered.

Other Embodiments

The present invention is not limited to the above embodiment and various modifications can be adopted within the scope of the present invention. For example, the present invention is not limited to the above embodiments, and can be modified, improved, and the like as appropriate. In addition, the material, shape, dimension, number, arrangement position, or the like of each component in the above embodiment are optional and are not limited as long as the present invention can be achieved.

For example, in the above embodiment, the service hole 31 formed in the inner panel 30 is a relatively large through hole, and the cover 40 has a relatively large flat plate shape corresponding to the contour shape of the service hole 31 (see FIG. 1). Therefore, as shown in FIG. 2, a space for fixing the plurality of electric wires 60 extending from the control box 50 can be ensured on the vehicle width direction inner side surface of the cover 40 constituting the cover module.

Figure 3:
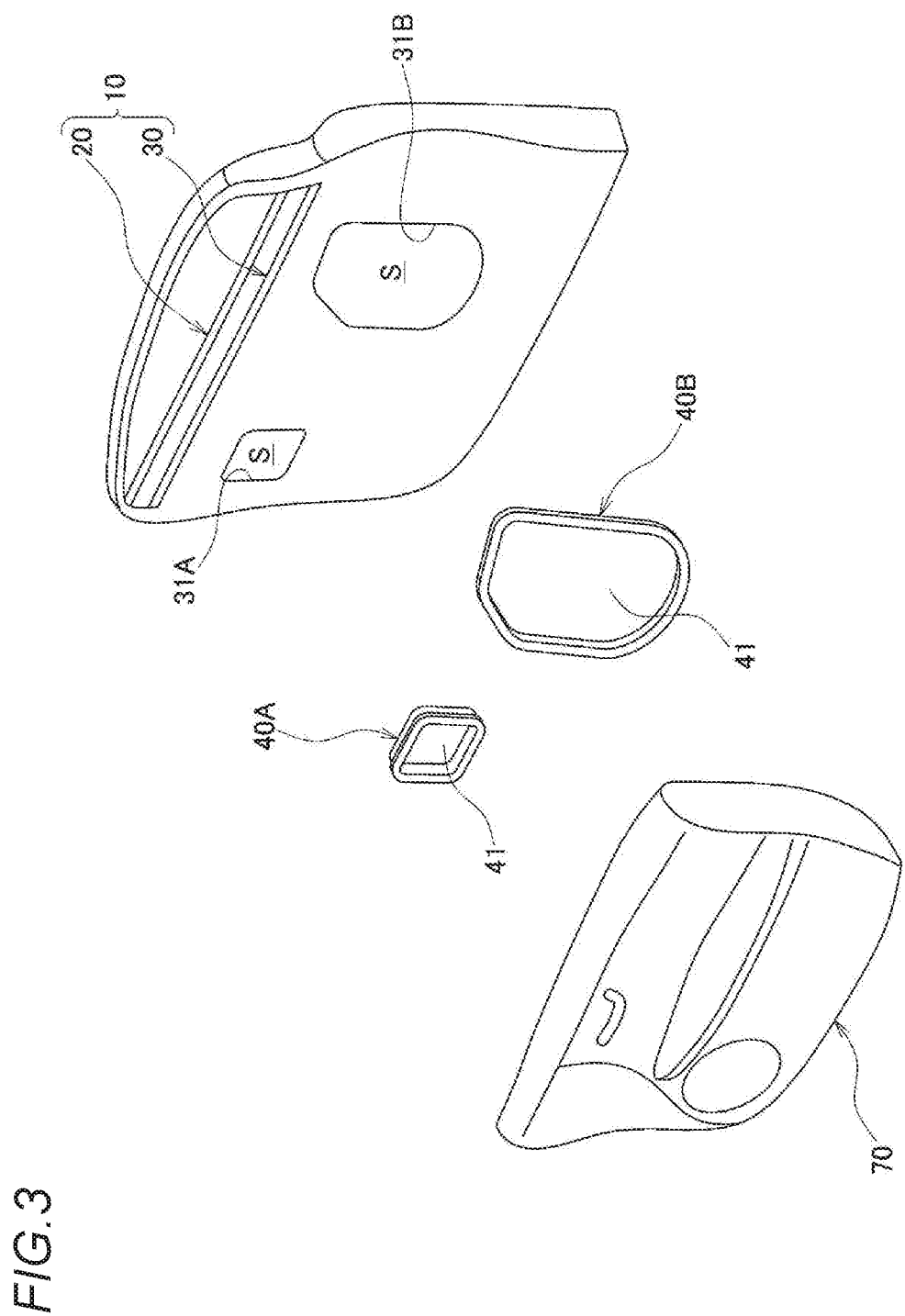
FIG. 3 is a diagram of a vehicle door structure according to a modification, corresponding to FIG. 1.
Figure 4:
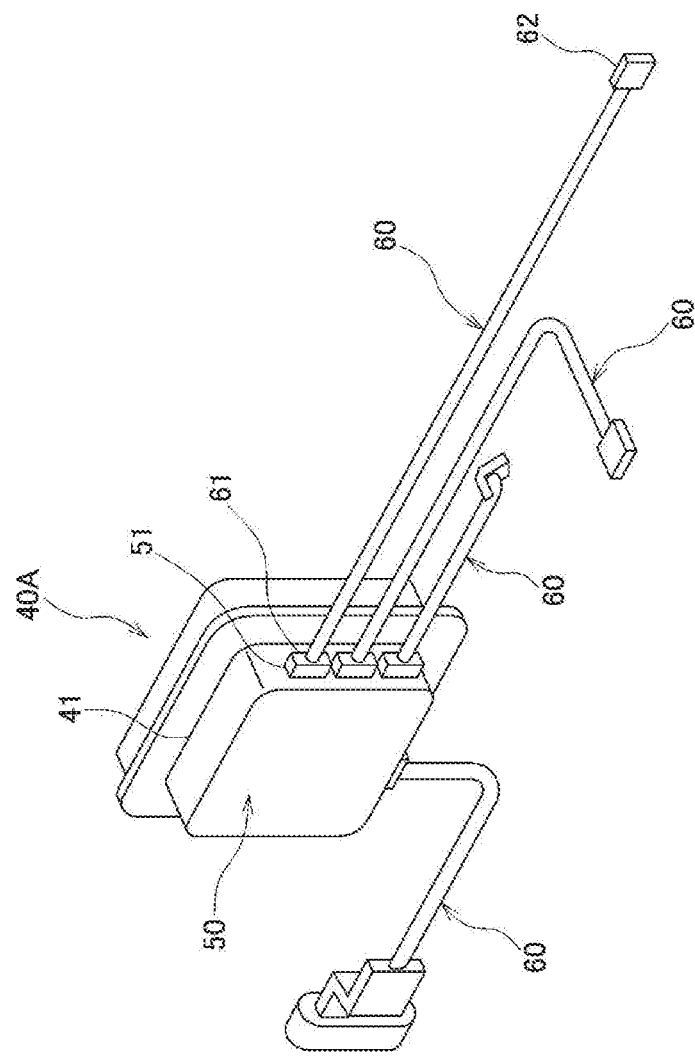
FIG. 4 is a diagram of the vehicle door structure according to the modification shown in FIG. 3, corresponding to FIG. 2.

In contrast, as shown in FIG. 3, when relatively small service holes 31A and 31B formed in the inner panel 30 are respectively closed by covers 40A and 40B having relatively small shapes respectively corresponding to contour shapes of the service holes 31A and 31B, and the control box 50 is fitted into the recess portion 41 of the cover 40A (see FIG. 4), a space for fixing the plurality of electric wires 60 extending from the control box 50 cannot be ensured on a vehicle width direction inner side surface of the cover 40A in the case of constituting a cover module. Therefore, in this case, a cover module is formed in which the control box 50 is fitted into the recess portion 41 of the cover 40A and the plurality of electric wires 60 extending from the control box 50 are not fixed to the cover 40A.

In addition, in the above embodiment, the plurality of electric wire connection portions 51 provided in the control box 50 are connected to the plurality of electric components in a one-to-one relationship via the plurality of electric wires 60. In contrast, the plurality of electric wire connection portions 51 provided in the control box 50 may not be connected to the plurality of electric components in a one-to-one relationship via the plurality of electric wires 60 (may be in a many-to-one or one-to-many connection relationship).

Further, in the above embodiment, a vehicle door structure that is opened and closed by rotating with respect to the vehicle body is adopted as the vehicle door structure 1. In contrast, a vehicle door structure that is opened and closed by sliding in a front-rear direction with respect to the vehicle body may be adopted as the vehicle door structure 1.

Here, the characteristics of the embodiment of the vehicle door structure 1 and the cover module according to the present invention described above will be briefly summarized and listed in the following [1] to [4].

[1]

A vehicle door structure (1) including:

an outer panel (20);

an inner panel (30) assembled to a vehicle width direction inner side surface of the outer panel (20) so as to form a panel space (S) with the outer panel (20);

a cover (40) assembled to the inner panel (30) so as to close a service hole (31), which is a through hole formed in the inner panel (30) in order to facilitate a work in the panel space (S);

a control box (50) assembled to the cover (40) and configured to control input/output of electric power and/or control signal to/from at least one of electric components disposed on the vehicle door; and a door trim (70) assembled to a vehicle width direction inner side surface of the inner panel (30) so as to cover the cover (40) and the control box (50).

[2]

In the vehicle door structure (1) according to the above (1), a recess portion (41), which is recessed to a vehicle width direction outer side and opens to a vehicle width direction inner side, is formed in a vehicle width direction inner side surface of the cover (40), and the control box (50) is assembled in the recess portion (41).

[3]

In the vehicle door structure (1) according to the above (1), on a side surface of the control box (50), a plurality of electric wire connection portions (51) are disposed along a peripheral direction of the side surface, and the plurality of electric wire connection portions (51) are connected to the plurality of electric components in a one-to-one relationship via a plurality of electric wires (60).

[4]

A cover module including:

a cover (40) assembled to an inner panel (30) constituting a part of a vehicle door structure (1) so as to close a service hole (31), which is a through hole formed in the inner panel (30) in order to facilitate a work in a panel space (S) formed between an outer panel (20) and the inner panel (30) assembled to a vehicle width direction inner side surface of the outer panel (20); and a control box (50) assembled to the cover (40) and configured to control input/output of electric power and/or control signal to/from at least one of electric components disposed on the vehicle door.

According to the vehicle door structure having the configuration described in the above [1], the through hole (service hole) formed in the inner panel in order to facilitate the work (typically, a work to install the electric component in the panel space) in the panel space between the outer panel and the inner panel is closed by the cover, the control box is assembled to the cover, and the cover and the control box are covered by the door trim. Therefore, by devising the shape of the entire cover and the shape of the position where the control box is assembled to the cover, it is possible to prevent the increase in thickness of the door due to the assembly of the control box, as compared with a mode in which the control box is assembled to the inner panel as described in the above literature.

In addition, the control box, to which the plurality of electric wires (to be connected to the plurality of electric components later) are connected, is assembled to the cover so as to prepare the cover module, and then the cover module can be assembled to the inner panel. Therefore, as compared with a mode in which the control box, to which the plurality of electric wires are connected, and the cover are individually assembled to the inner panel, the work of assembling the components to the inner panel is easier.

Further, since the service hole is closed by the cover, it is possible to provide the door structure having excellent waterproofness and sound insulation. Further, when a sensor for detecting a collision of the vehicle with the door by detecting a change in pressure in the panel space is installed in the panel space, since the service hole is closed by the cover, it is possible to provide a door structure in which an appropriate pressure fluctuation can occur in the panel space when the vehicle collides with the door.

According to the vehicle door structure having the configuration described in the above [2], the control box is assembled (fitted) into the recess portion formed in the vehicle width direction inner side surface of the cover. Therefore, as compared with a mode in which the control box is assembled to the plane of the vehicle width direction inner side surface of the cover, it is possible to reliably prevent the increase in thickness of the door due to the assembly of the control box.

According to the vehicle door structure having the configuration described in the above [3], the plurality of electric wire connection portions disposed along the peripheral direction of the side surface of the control box are connected to the plurality of electric components in a one-to-one relationship via the plurality of electric wires. Therefore, there is no position for the plurality of electric wires extending from the control box to gather together, so that it is possible to prevent the increase in thickness of the door due to an increase in diameter of a bundle of electric wires in which the plurality of electric wires are gathered.

According to the cover module having the configuration described in the above [4], the through hole (service hole) formed in the inner panel in order to facilitate the work (typically, a work to install the electric component in the panel space) in the panel space between the outer panel and the inner panel can be closed by the cover of the cover module in which the cover and the control box are integrated. Therefore, by devising the shape of the entire cover and the shape of the position where the control box is assembled to the cover in the cover module, it is possible to prevent the increase in thickness of the door due to the assembly of the control box, as compared with a mode in which the control box is assembled to the inner panel as described in the above literature.

In addition, the control box, to which the plurality of electric wires (to be connected to the plurality of electric components later) are connected, is assembled to the cover so as to prepare the cover module, and then the cover module can be assembled to the inner panel. Therefore, as compared with a mode in which the control box, to which the plurality of electric wires are connected, and the cover are individually assembled to the inner panel, the work of assembling the components to the inner panel is easier.

Further, since the service hole is closed by the cover, it is possible to provide the door structure having excellent waterproofness and sound insulation. Further, when a sensor for detecting a collision of the vehicle with the door by detecting a change in pressure in the panel space is installed in the panel space, since the service hole is closed by the cover, it is possible to provide a door structure in which an appropriate pressure fluctuation can occur in the panel space when the vehicle collides with the door.

According to the present invention, it is possible to provide a vehicle door structure and a cover module capable of preventing the increase in thickness of the door due to the assembly of the control box.

What is claimed is:

1. A vehicle door structure comprising:
    an outer panel;
    an inner panel assembled to a vehicle width direction inner side surface of the outer panel so as to form a panel space with the outer panel;
    a cover assembled to the inner panel so as to close a service hole, which is a through hole formed in the inner panel in order to facilitate a work in the panel space;
    a control box assembled to the cover and configured to control input/output of electric power and/or control signal to/from at least one of electric components disposed on a vehicle door; and
    a door trim assembled to a vehicle width direction inner side surface of the inner panel so as to cover the cover and the control box, wherein
    the service hole has a contour shape, and the cover and the control box have a contour shape that corresponds to the contour shape of the service hole, respectively.

2. The vehicle door structure according to claim 1, wherein
    a recess portion, which is recessed to a vehicle width direction outer side and opens to a vehicle width direction inner side, is formed in a vehicle width direction inner side surface of the cover, and the control box is assembled in the recess portion.

3. The vehicle door structure according to claim 1, wherein
    on a side surface of the control box, a plurality of electric wire connection portions are disposed along a peripheral direction of the side surface of the control box, and the plurality of electric wire connection portions are connected to the plurality of electric components in a one-to-one relationship via a plurality of electric wires.

4. A cover module comprising:
    a cover assembled to an inner panel constituting a part of a vehicle door structure so as to close a service hole, which is a through hole formed in the inner panel in order to facilitate a work in a panel space formed between an outer panel constituting a part of a vehicle door structure and the inner panel assembled to a vehicle width direction inner side surface of the outer panel; and
    a control box assembled to the cover and configured to control input/output of electric power and/or control signal to/from at least one electric component disposed on the vehicle door, wherein the service hole has a contour shape, and the cover and the control box have a contour shape that corresponds to the contour shape of the service hole, respectively.

\* \* \* \* \*